(12) United States Patent
Takada et al.

(10) Patent No.: US 7,690,818 B2
(45) Date of Patent: Apr. 6, 2010

(54) VEHICLE HEADLAMP

(75) Inventors: Kenichi Takada, Shizuoka (JP); Yusuke Nakada, Shizuoka (JP); Masashi Tatsukawa, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 163 days.

(21) Appl. No.: 11/881,427

(22) Filed: Jul. 27, 2007

(65) Prior Publication Data

US 2008/0025036 A1      Jan. 31, 2008

(30) Foreign Application Priority Data

Jul. 31, 2006    (JP)    ............... 2006-207656

(51) Int. Cl.
*F21V 7/06* (2006.01)
(52) U.S. Cl. ............... 362/299; 362/297; 362/303; 362/518; 362/517; 362/519; 362/539; 362/538
(58) Field of Classification Search ......... 362/517–518, 362/519, 539, 538, 297, 299, 303
See application file for complete search history.

(56) References Cited

U.S. PATENT DOCUMENTS

| 5,307,247 | A | | 4/1994 | Cejnek |
| 5,430,623 | A | * | 7/1995 | Uchida ............ 362/517 |
| 5,636,917 | A | * | 6/1997 | Furami et al. ........ 362/538 |
| 6,312,147 | B2 | * | 11/2001 | Eichler ............ 362/539 |
| 6,478,457 | B1 | * | 11/2002 | Manley ............ 362/465 |

(Continued)

FOREIGN PATENT DOCUMENTS

DE    43 15 401 A1    11/1994

(Continued)

OTHER PUBLICATIONS

English abstract of JP7029402 published Jan. 31, 1995, Data supplied from the esp@cenet database, 1 page.

(Continued)

*Primary Examiner*—Jong-Suk (James) Lee
*Assistant Examiner*—Robert J May
(74) *Attorney, Agent, or Firm*—Osha • Liang LLP

(57) ABSTRACT

A vehicle headlamp includes a projection lens through which an optical axis passes. The optical axis extends in a front-and-rear direction of a vehicle. The vehicle headlamp includes a light source disposed on a rear side of a rear focal point of the projection lens; a reflector which reflects a direct light from the light source toward a front direction so as to become close to the optical axis; a shade disposed between the projection lens and the light source and having an edge portion positioned near the rear focal point of the projection lens; and an auxiliary reflector disposed between the projection lens and a shade. The auxiliary reflector reflects a part of the light reflected by the reflector toward the projection lens such that an upward irradiation light is irradiated from the projection lens. The shade shields a part of the light reflected by the reflector and a part of the direct light emitted from the light source and forms a cutoff line of a light distribution pattern. A space is provided between the auxiliary reflector and the shade so as to maintain a light quantity of at least 75% of a main light distribution obtained by the light reflected from the reflector.

15 Claims, 6 Drawing Sheets

U.S. PATENT DOCUMENTS

| | | | |
|---|---|---|---|
| 6,494,603 B1 * | 12/2002 | Takada | 362/538 |
| 6,736,533 B2 * | 5/2004 | Matsumoto et al. | 362/539 |
| 7,563,008 B2 * | 7/2009 | Chinniah et al. | 362/520 |
| 2003/0165066 A1 * | 9/2003 | Watanabe et al. | 362/523 |
| 2005/0024889 A1 * | 2/2005 | Sugimoto | 362/539 |
| 2005/0122735 A1 * | 6/2005 | Watanabe et al. | 362/539 |

FOREIGN PATENT DOCUMENTS

| | | |
|---|---|---|
| DE | 100 04 699 A1 | 8/2001 |
| FR | 2 857 308 A | 1/2005 |
| FR | 2 863 343 A | 6/2005 |
| JP | 7-29402 | 1/1995 |

OTHER PUBLICATIONS

European Search Report issued in European Application No. EP 07 11 3317 dated Oct. 24, 2007, 6 pages.

* cited by examiner

VEHICLE HEADLAMP

CROSS-REFERENCE TO RELATED APPLICATIONS

The present invention claims priority from Japanese Patent Application No. 2006-207656 filed on Jul. 31, 2006, the entire content of which is incorporated herein by reference.

BACKGROUND OF INVENTION

1. Field of the Invention

The present invention relates to a projector-type vehicle headlamp. More specifically, the present invention relates to a vehicle headlamp operable to irradiate an overhead sign.

2. Background Art

A projector-type vehicle headlamp is configured such that light emitted from a light source disposed on an optical axis extending in a longitudinal direction (a front-and-rear direction) of the vehicle close to the optical axis is reflected in a forward direction by a reflector. The reflected light is irradiated in a forward direction of a lamp through a projection lens provided in front of the reflector.

In a case in which such a projector-type vehicle headlamp is adapted for a low beam (dipped beam) irradiation, a shade, which shields a part of the light reflected by the reflector and removes an upward irradiation light, is provided between the projection lens and the reflector. Thus, a beam is irradiated in a forward direction in a low beam light distribution pattern having a predetermined cutoff line.

In the projector-type vehicle headlamp, the upward irradiation light is removed almost completely by the shade. For this reason, an overhead sign (hereinafter referred to as OHS) disposed above a road surface in the forward direction of the vehicle cannot be seen clearly.

Therefore, there has been proposed a vehicle headlamp in which an auxiliary reflector for causing a part of a light reflected by a reflector to be incident as an upward irradiation light on the projection lens is provided extending toward the projection lens side from the vicinity of an upper edge of the shade and an OHS irradiation light for irradiating the OHS is obtained by the upward irradiation light incident on the projection lens by the auxiliary reflector (for example, see JP-A-7-29402).

However, in a case in which the auxiliary reflector for causing a part of the light reflected by the reflector to be incident as the upward irradiation light on the projection lens is provided in the vicinity of the upper edge of the shade for forming a cutoff line as in the vehicle headlamp which has been described in JP-A-7-29402, a main light distribution reflected by the reflector and passing through the vicinity of the upper edge of the shade is intercepted by the auxiliary reflector. For this reason, there is a possibility that an insufficient quantity of light of the main light distribution might be caused.

In the above vehicle headlamp, a light distribution pattern is formed by the OHS irradiation light so as to be continuous just above the cutoff line of a low beam light distribution pattern formed by the shade. Consequently, there is a possibility that the OHS irradiation light might cause glare for a car running on an opposing lane if a quantity of the light reflected by the auxiliary reflector is large.

Therefore, there has been proposed a technique for regulating deposition treatment (i.e., regulating a thickness of a reflecting film) in order to reduce a quantity of the light reflected by an auxiliary reflector formed with a reflecting surface by depositing a reflecting film on a surface of a transparent member. However, a great deal of time and labor is required for the process of forming the reflecting film through deposition, thereby causing an increase in cost.

SUMMARY OF INVENTION

One or more embodiments provide a vehicle headlamp in which an auxiliary reflector for obtaining an OHS irradiation light does not intercept a main light distribution passing through the vicinity of an upper edge of a shade and the OHS irradiation light can be obtained without causing an insufficient quantity of light of the main light distribution.

According to a first aspect of one or more embodiments of the invention, a vehicle headlamp comprises: a projection lens through which an optical axis passes, the optical axis extending in a front-and-rear direction of a vehicle; a light source disposed on a rear side of a rear focal point of the projection lens; a reflector which reflects a direct light from the light source toward a front direction so as to become close to the optical axis; a shade disposed between the projection lens and the light source, and having an edge portion positioned in the vicinity of the rear focal point of the projection lens; and an auxiliary reflector disposed between the projection lens and the shade, wherein the shade shields a part of the light reflected by the reflector and a part of the direct light emitted from the light source, and forms a cutoff line of a light distribution pattern, the auxiliary reflector reflects a part of the light reflected by the reflector toward the projection lens such that an upward irradiation light is irradiated from the projection lens, and a space for maintaining a light quantity of 75% or more of a main light distribution obtained by the light reflected from the reflector is provided between the auxiliary reflector and the shade.

Other aspects and advantages of the invention will be apparent from the following description and the appended claims.

BRIEF DESCRIPTION OF DRAWINGS

FIG. 8A is a perspective view showing a main light distribution pattern formed on a virtual vertical screen disposed in a forward position of 25 m of a lamp by a light irradiated in a forward direction by a lamp unit in the case in which the auxiliary reflector is not present, and FIG. 8B is a perspective view showing the main light distribution pattern formed on the virtual vertical screen disposed in the forward position of 25 m from the lamp by the light irradiated in the forward direction by the lamp unit in the case in which the auxiliary reflector is present.

FIG. 9A is an explanatory view showing a light distribution pattern in a normal use, and FIG. 9B is an explanatory view showing a light distribution pattern in a fail-safe by a swivel mechanism.

DETAILED DESCRIPTION

A vehicle headlamp according to exemplary embodiments of the invention will be described below in detail with reference to the drawings.

Figure 1:
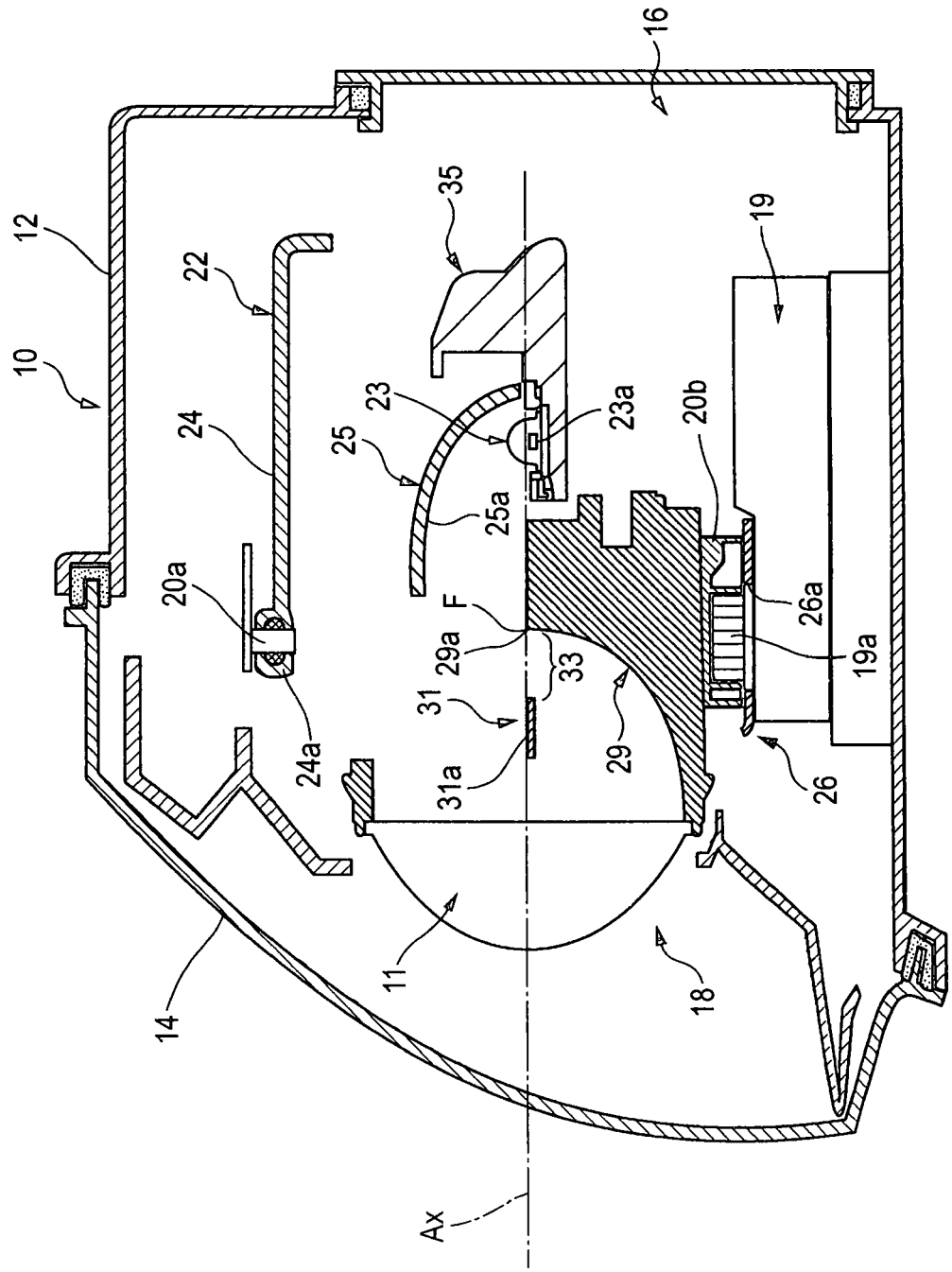
FIG. 1 is a longitudinal sectional view showing a vehicle headlamp according to an exemplary embodiment of the invention.

In a vehicle headlamp 10 according to an exemplary embodiment, as shown in FIG. 1, a lamp unit 18 of a projector type is accommodated in a lamp chamber 16 formed by a lamp body 12 and a transparent cover (cover) 14 attached to a forward opening portion thereof.

As shown in FIG. 1, the lamp unit 18 of the projector type is supported on the lamp body 12 through a frame 22, and the frame 22 is supported on the lamp body 12 through an aiming mechanism, which is not shown.

The aiming mechanism serves to finely regulate an attachment position and an attachment angle of the lamp unit 18. In a stage in which the aiming regulation is carried out, a lens center axis Ax of the lamp unit 18 is extended in a downward direction by approximately 0.5 to 0.6 degrees with respect to a longitudinal direction of the vehicle.

The frame 22 has a shape of an almost rectangular frame as seen from a front and is provided with support plates 24 and 26 extended in the longitudinal direction in upper and lower parts. A front end of the upper support plate 24 is provided with a bearing portion 24a, and a supported shaft 20a provided in an upper part of the lamp unit 18 is rotatably supported by the bearing portion 24a. The lower support plate 26 has a circular shaft inserting hole 26a formed in a portion of the support plate 26, which is positioned under the bearing portion 24. A swivel actuator 19 for rotating the lamp unit 18 in a horizontal direction is fixed to a lower surface of the lower support plate 26 of the frame 22.

The swivel actuator 19 of the swivel mechanism is driven in accordance with a steering operation so that an output shaft 19a is rotated, for example. The output shaft 19a is inserted through the shaft inserting hole 26a of the support plate 26 and is thus fitted in a connecting shaft 20b provided in a lower part of the lamp unit 18 so that the connecting shaft 20b is connected to the output shaft 19a.

Figure 2:
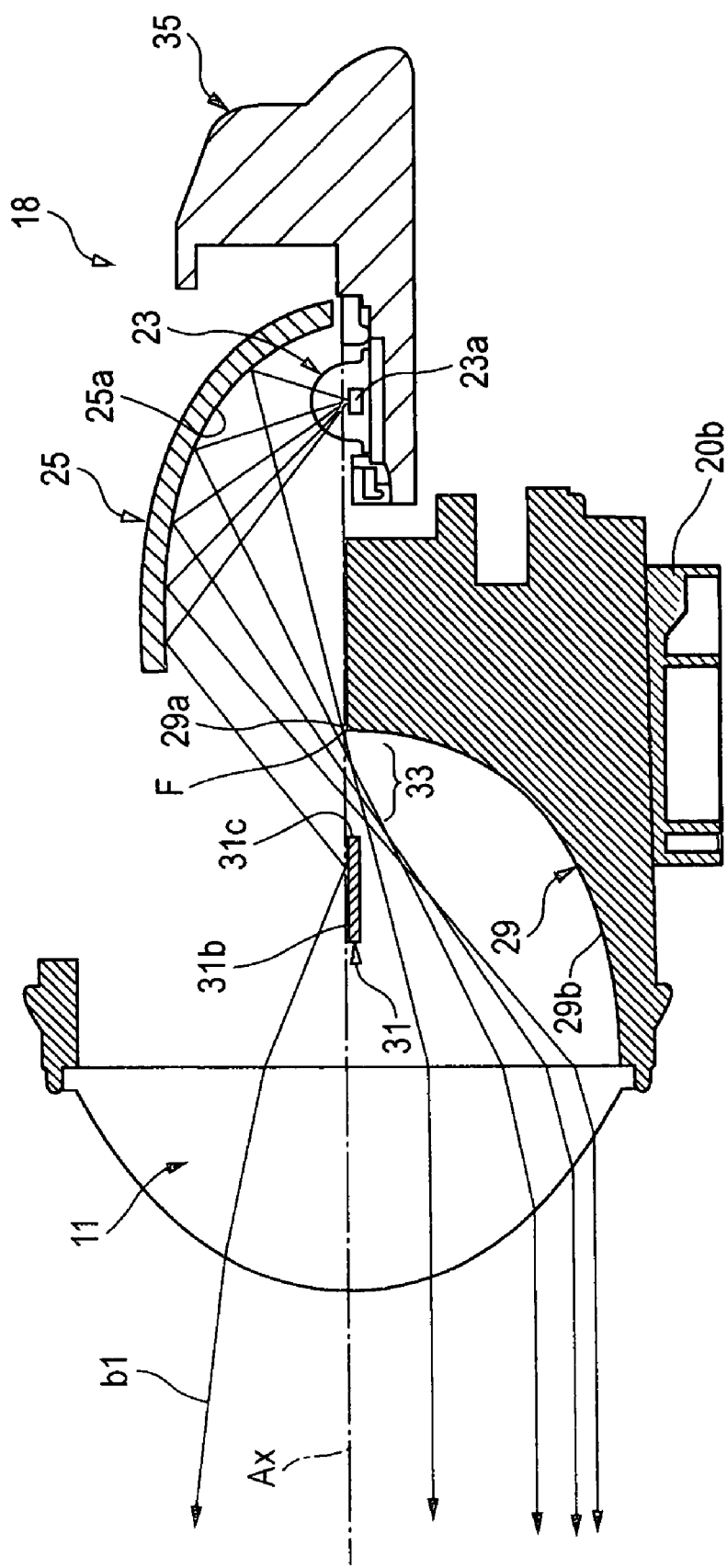
FIG. 2 is an explanatory view showing an operation of a lamp unit in the vehicle headlamp illustrated in FIG. 1.

When the swivel actuator 19 is driven, the output shaft 19a is rotated so that the lamp unit 18 is rotated in a horizontal direction with the rotation of the output shaft 19a. Namely, the optical axis is rotated in the horizontal direction by means of the swivel mechanism As shown in FIGS. 1 and 2, the lamp unit 18 is of the projector type. A projection lens 11 is disposed on the lens center axis (optical axis) Ax extended in the longitudinal direction of the vehicle. A light source 23a to be a light emitting portion of an LED lamp 23 is disposed behind a rear focal point F of the projection lens 11. A reflector 25 for reflecting light (direct light) is radiated from the light source 23a close to the lens center axis Ax in a forward direction by setting the light source 23a to be a first focal point. A shade 29 is disposed between the projection lens 11 and the light source 23a. The shade 29 has an edge portion 29a positioned in the vicinity of the rear focal point F of the projection lens 11 to shield a part of the light reflected by the reflector 25 and a part of the direct light emitted from the light source 23a, thereby forming a cutoff line of a light distribution pattern. An auxiliary reflector 31 is disposed between the projection lens 11 and the shade 29. The auxiliary reflector 31 serves to reflect a part of the light reflected by the reflector 25 toward the projection lens 11 and to emit an upward irradiation light b1 from the projection lens 11.

A space 33 for maintaining the main light distribution obtained by the light reflected from the reflector 25 in a light quantity of 75% or more is provided between the auxiliary reflector 31 and the shade 29.

The projection lens 11 is a plano-convex lens having a front surface formed by a convex surface and a rearward surface formed by a plane. The projection lens 11 serves to forward project, as an inverted image, an image on a focal plane including the rear focal point F.

The LED lamp 23 is attached to a lamp holder 35 inserted and fixed to a rear end of the reflector 25 in such a manner that the light source 23a is positioned on almost the optical axis Ax.

The reflector 25 has a reflecting surface 25a taking a shape of an almost elliptical sphere with the optical axis Ax set to be a center axis. In the reflecting surface 25a, a sectional shape including the optical axis Ax is set to be an almost elliptical curved surface in which a central position of the light source 23a is a first focal point and the vicinity of the rear focal point F of the projection lens 11 is a second focal point, and the light emitted from the light source 23a is collected and reflected close to the lens center axis Ax in a forward direction. An eccentricity of the reflecting surface 25a is set to be gradually increased from a vertical section toward a horizontal section.

Figure 3:
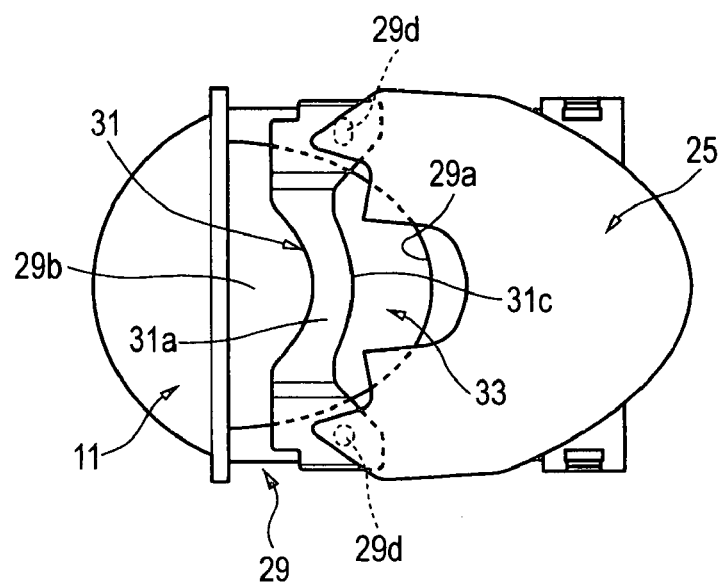
FIG. 3 is a plan view showing the lamp unit illustrated in FIG. 2.
Figure 4:
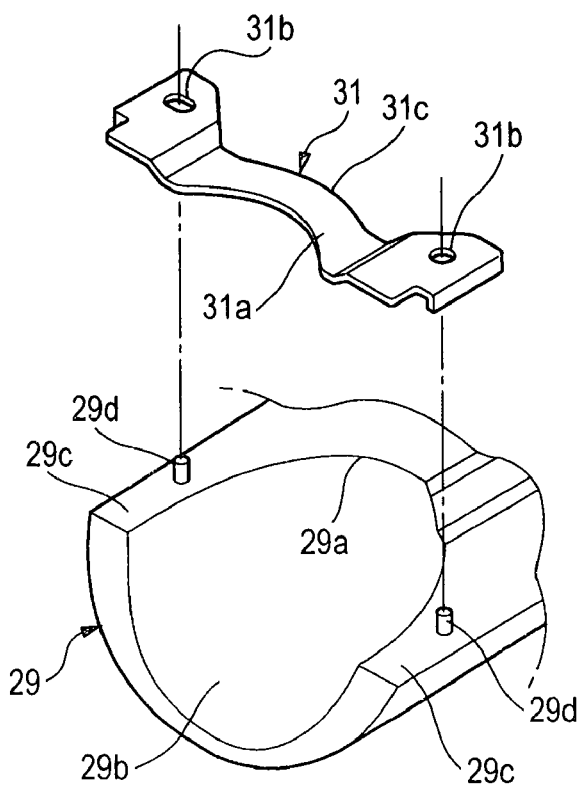
FIG. 4 is an exploded perspective view showing a shade and an auxiliary reflector illustrated in FIG. 3.
Figure 5:
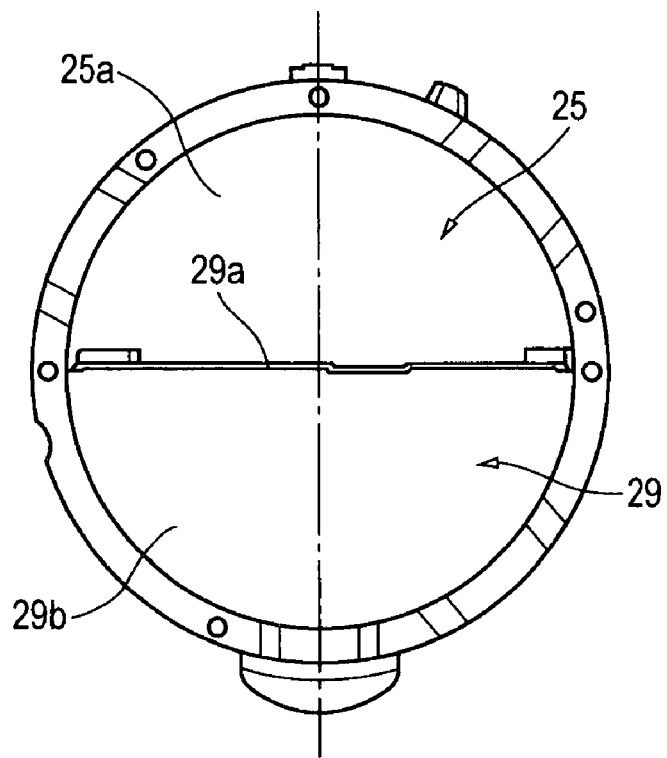
FIG. 5 is a front view showing the lamp unit illustrated in FIG. 2.

In one or more embodiments, the shade 29 takes a shape of a block (a mass) serving as a support frame for the projection lens 11 and the reflector 25. A front surface 29b facing the projection lens 11 is a curved surface taking an almost eggshell shape in which a width is gradually increased toward a forward direction as shown in FIGS. 3 and 4. Consequently, the edge portion (the upper edge portion) 29a, which is close to the optical axis Ax, is curved to take a concave contour, as seen from above, toward the projection lens 11.

Moreover, a boss 29d for attaching the auxiliary reflector 31 is protruded in two portions, that is, left and right portions on a front end side of an upper end face 29c of the shade 29 extended horizontally from the edge portion 29a toward an outside thereof.

As shown in FIGS. 2 to 4, the auxiliary reflector 31 is an almost belt-shaped plate member crossing almost the vicinity of the optical axis Ax in a transverse direction of the vehicle with the space 33 formed between the auxiliary reflector 31 and the shade 29, and an upper surface 31a serves as a reflecting surface for reflecting the light reflected by the reflector 25 toward the projection lens 11. An attachment hole 31b formed on both ends of the auxiliary reflector 31 is fitted in the boss 29d of the shade 29 so that the auxiliary reflector 31 is positioned with respect to the shade 29.

According to one or more embodiments, as shown in FIGS. 3 and 4, an edge portion 31c of the auxiliary reflector 31 on a side of the reflector 25 is curved to have a convex contour, as seen from above.

In one or more embodiments, by properly setting the attachment position of the auxiliary reflector 31 to the shade 29, the size of the upper surface 31a to be the reflecting surface, and the curved shape of the edge portion 31a on the side of the reflector 25 which takes the convex shape as seen from the top, it is possible to regulate the size of the space 33 through which the light reflected by the reflector 25 is transmitted. Thus, the quantity of light transmitted through the space 33 can be maintained at 75% or more of the main light distribution sent from the reflector 25.

More specifically, the light transmitted through the space 33 maintains a light quantity of 75% or more of the main light distribution sent from the reflector 25. Consequently, it is possible to avoid a reduction in a visibility due to an insufficient quantity of light in the light distribution pattern obtained by the main light distribution.

Figure 7:
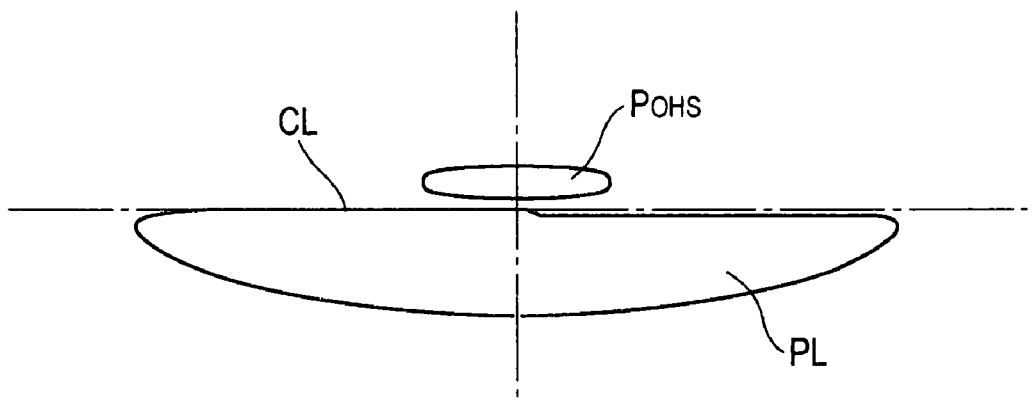
FIG. 7 is a perspective view showing a light distribution pattern formed on a virtual vertical screen disposed in a forward position of 25 mm from a lamp by a light irradiated in a forward direction by the vehicle headlamp illustrated in FIG. 1.

According to the vehicle headlamp 10 in accordance with one or more embodiments described above, as shown in FIG. 7, the light reflected by the reflector 25 and transmitted through the space 33 ahead of the shade 29 is irradiated in a forward direction through the projection lens 11, thereby forming a low beam light distribution pattern PL. Light reflected by the reflector 25 is transmitted toward the projection lens 11 Light is reflected by the auxiliary reflector 31, is incident on the projection lens 11 and is emitted as the upward irradiation light b1. This upward irradiation light b1 is changed into an OHS irradiation light for irradiating an OHS forming an OHS light distribution pattern $P_{OHS}$, which is a light distribution pattern for the OHS irradiation above the low beam light distribution pattern PL.

Accordingly, it is possible to maintain an excellent visibility for the OHS.

The auxiliary reflector 31 for obtaining the OHS irradiation light is disposed ahead of the shade 29 by forming, together with the shade 29, the space 33 through which the main light distribution is obtained by the light reflected from the reflector 25. The quantity of the light reflected from the reflector 25 that passes through the space 33 is 75% or more. Therefore, the main light distribution passing through the vicinity of the upper edge of the shade 29 is not intercepted. Thus, it is possible to obtain the OHS irradiation light without causing the insufficiency of the light quantity of the main light distribution. Accordingly, it is possible to implement an excellent forward irradiation without an insufficient quantity of light.

In order to confirm that an insufficient quantity of light is not generated by providing the auxiliary reflector 31, the inventors measured a luminous flux in a state in which the auxiliary reflector 31 is removed and a state in which the auxiliary reflector 31 is attached and compared the main light distribution patterns obtained by the main light distribution in the vehicle headlamp 10.

Figure 8A:
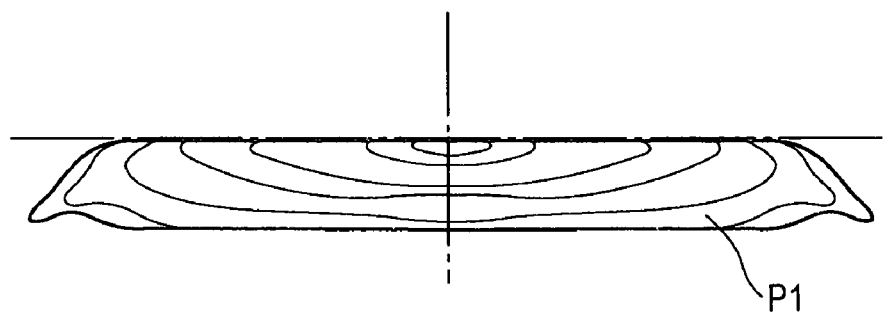
FIGS. 8A and 8B are comparative views, each showing a light distribution pattern of a main light distribution which is varied depending on the presence of the auxiliary reflector in the vehicle headlamp illustrated in FIG. 1. More specifically.
Figure 8B:
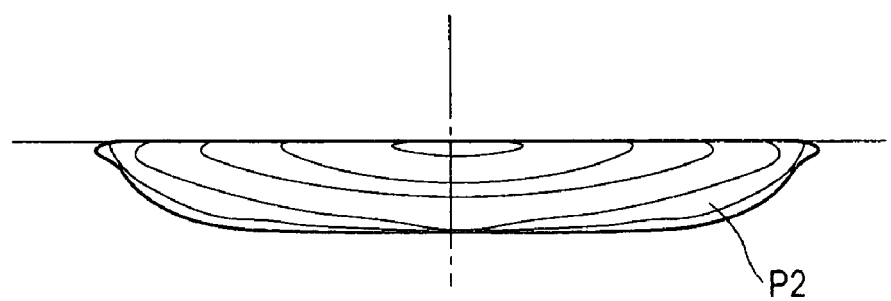

FIG. 8A shows a light distribution pattern P1 obtained by a main light distribution (a light quantity of 100%) in a state in which the auxiliary reflector 31 is not present and FIG. 8B shows a light distribution pattern P2 obtained by a main light distribution (a light quantity of 75%) in a state in which the auxiliary reflector 31 is present. Referring to the light distribution pattern P2, it could be confirmed that an irradiation area in a transverse direction is slightly smaller than that in the light distribution pattern P1, almost the same illuminance distributions are obtained and an insufficient quantity of light can be prevented from being caused by maintaining the main light distribution to be about 75%.

The auxiliary reflector 31 for obtaining the OHS irradiation light is provided with the space 33 formed between the auxiliary reflector 31 and the shade 29. Consequently, the OHS light distribution pattern POHS is formed by the OHS irradiation light upward apart from a cutoff line CL of the main light distribution pattern PL formed by the shade 29. Therefore, it is possible to prevent the OHS irradiation light from being a glare for a car running on an opposing lane.

In addition, the auxiliary reflector 31 for obtaining the OHS irradiation light is set to be a separate component from the shade 29 in one or more embodiments. Therefore, in the case in which both a lamp unit having an OHS irradiating function and a lamp unit having no OHS irradiating function are developed, the shade 29 to be used in each of the units can be a common component irrespective of the presence of the OHS irradiating function. By decreasing the number of components to be designed and managed, it is also possible to reduce development cost.

In the vehicle headlamp 10 according to one or more embodiments, as shown in FIGS. 3 and 4, the edge portion 29*a* of the shade 29 is curved to take the concave shape, as seen from above, the concave shape having an opened part on a side of the projection lens 11. Therefore, the contour of the upper edge forming the cutoff line CL can take a shape conforming to the rear focal plane of the projection lens 11. Thus, it is possible to easily form an excellent cutoff line CL.

In a case in which the edge portion 29*a* of the shade 29 is curved to take the concave shape, as seen from above, the upper edge of the shade 29 takes the curved shape which retreats more greatly toward the light source 23 side when the optical axis Ax is closer. Therefore, in a configuration in which the space 33 for transmitting the main light distribution obtained by the light reflected from the reflector 25 therethrough is maintained ahead of the shade 29, it is possible to easily crosslink the auxiliary reflector 31 to the forward part of the shade 29. Thus, the auxiliary reflector 31 can readily be provided.

By curving the edge portion 31*a* on the reflector 25 side in the auxiliary reflector 31 to take the convex shape, as seen from above, in conformity to the edge portion 29*a* of the shade 29, it is possible to prevent the main light distribution passing through the vicinity of the rear focal plane of the projection lens 11 from being intercepted by the auxiliary reflector 31, thereby preventing an insufficient quantity of light in the main light distribution. Consequently, it is possible to easily maintain the space 33 through which the main light distribution is transmitted between the reflector 25 and the shade 29.

Figure 9A:
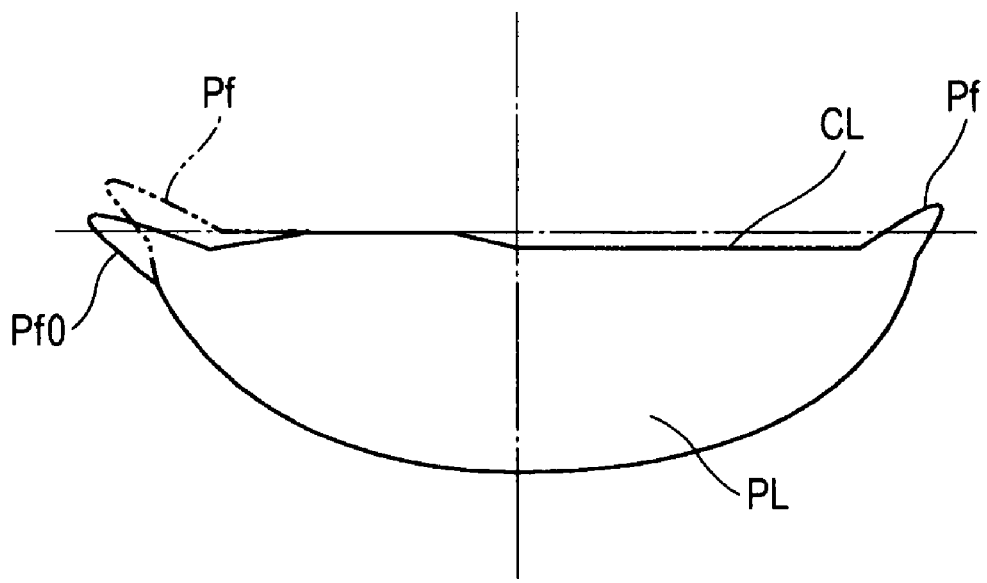
FIGS. 9A and 9B are explanatory views, each showing a light distribution pattern, which is improved by a shape of the shade illustrated in FIG. 6 as seen from a front. More specifically.

By using the projection lens 11 having a short focal length in order to cause the lamp unit 18 to be compact by means of the LED lamp 23, a bound Pf is generated by an eclipse of the projection lens 11 on both sides of the light distribution pattern PL obtained by the main light distribution as shown in FIG. 9A.

Figure 9B:
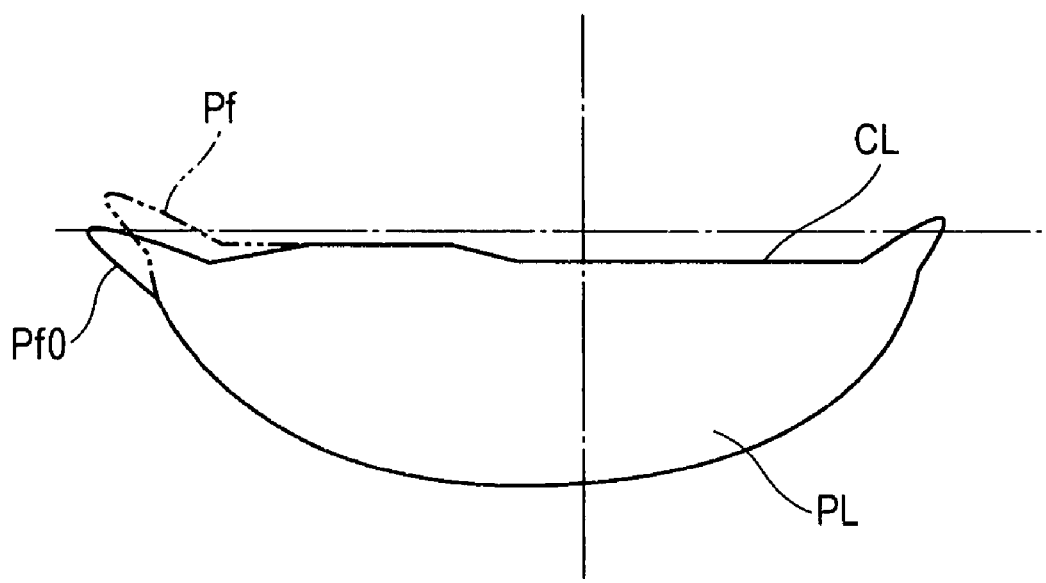

When the lamp unit 18 is rotated horizontally in a fail-safe of the swivel mechanism, there is a possibility that the bound Pf might be protruded upward from the cutoff line CL as shown in FIG. 9B, causing a glare for a car running ahead of a driver and a pedestrian.

Figure 6:
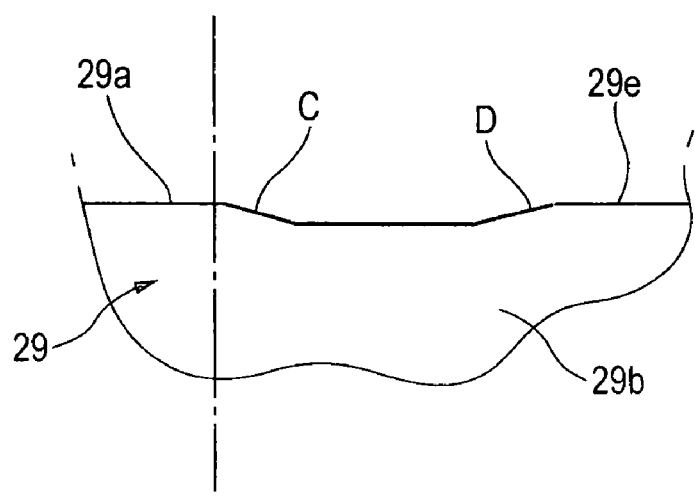
FIG. 6 is an enlarged view showing an upper edge of the shade illustrated in FIG. 5.

However, the edge portion 29*a* of the shade 29 according to one or more embodiments is set to take a shape of a dent in which the position of the upper edge is lowered from both end sides as seen from a front and is formed in a concave shape seen from a front in an upward direction as shown in FIG. 6.

More specifically, the edge portion 29*a* of the shade 29 is formed to take the concave shape seen from the front in the upward direction by a step C formed on the edge portion 29*a* of the shade 29 in order to form the cutoff line CL of the low beam light distribution pattern PL and a step D formed originally by a portion 29*e* obtained by relatively upward bulging the left end side of the edge portion 29*a* forming the cutoff line CL on a self-lane side.

By the shielding effect of the portion 29*e* obtained by bulging the left end side of the edge portion 29*a* of the shade 29 relatively upward, therefore, a bound formed on the left end side of the light distribution pattern PL is improved into a bound Pf0 shown in a solid line in the drawing as shown in FIGS. 9A and 9B so that an amount of an upward protrusion can be reduced. Consequently, it is possible to prevent a glare for a car running ahead of a driver and a pedestrian from being caused by the bound.

While description has been made in connection with an exemplary embodiment of the present invention, it will be obvious to those skilled in the art that various changes and modification may be made therein without departing from the present invention. It is aimed, therefore, to cover in the appended claims all such changes and modifications falling within the true spirit and scope of the present invention.

What is claimed is:

1. A vehicle headlamp comprising:
   a projection lens through which an optical axis passes, the optical axis extending in a front-and-rear direction of a vehicle;
   a light source disposed on a rear side of a rear focal point of the projection lens;
   a reflector that reflects a direct light from the light source toward a front direction so as to become close to the optical axis;
   a shade disposed between the projection lens and the light source, the shade comprising an edge portion positioned near the rear focal point of the projection lens; and
   an auxiliary reflector disposed in a vicinity of the optical axis between the projection lens and the shade, wherein
      the shade shields a part of the light reflected by the reflector and a part of the direct light emitted from the light source, and forms a cutoff line of a light distribution pattern,
      the auxiliary reflector reflects a part of the light reflected by the reflector such that an upward irradiation light is irradiated from the projection lens, and
      the auxiliary reflector is attached directly to the shade whereby a space is provided between the auxiliary reflector and the shade through which a light quantity of at least 75% of a main light distribution is maintained of the light reflected from the reflector.

2. The vehicle headlamp according to claim 1, wherein the edge portion of the shade is curved in a concave shape facing toward the projection lens when seen from above, and wherein an edge portion of the auxiliary reflector on a side of the reflector is curved in a convex shape when seen from above.

3. The vehicle headlamp according to claim 2, wherein the edge portion of the shade is formed in a concave shape facing an upward direction when seen from the front, and wherein the optical axis is rotated in a horizontal direction by a swivel mechanism.

4. The vehicle headlamp according to claim 3, wherein the swivel mechanism comprises an actuator that is driven in accordance with a steering operation of the vehicle.

5. The vehicle headlamp according to claim 1, wherein the edge portion of the shade is formed in a concave shape facing an upward direction when seen from the front, and wherein the optical axis is rotated in a horizontal direction by a swivel mechanism.

6. The vehicle headlamp according to claim 1, wherein the shade comprises a front surface facing the projection lens, wherein the front surface of the shade is curved, wherein a width of the front surface is gradually increased toward the front direction, and wherein the shade supports the projection lens.

7. The vehicle headlamp according to claim 1, wherein the shade and the auxiliary reflector are separate components.

8. The vehicle headlamp according to claim 1, wherein the upward irradiation light forms an overhead sign light distribution pattern which is apart from the cutoff line and above the light distribution pattern under the cutoff line.

9. A vehicle headlamp comprising:
   a projection lens;
   a light source disposed on a rear side of a rear focal point of the projection lens; a reflector that reflects light emitted from the light source; a shade disposed between the projection lens and the light source; and
   an auxiliary reflector disposed in a vicinity of an optical axis of the vehicle headlamp between the projection lens and the shade,
      wherein the shade comprises an edge portion positioned near the rear focal point of the projection lens,
      wherein the shade shields a part of the light reflected by the reflector and a part of light emitted directly from the light source,
      wherein the auxiliary reflector reflects a part of the light reflected by the reflector as an upward irradiation light, and
      the auxiliary reflector is attached directly to the shade whereby the auxiliary reflector is disposed at a distance from the shade providing a space through which at least 75% of a main light distribution obtained by the light reflected from the reflector is maintained.

10. The vehicle headlamp according to claim 9, wherein the edge portion of the shade is curved in a concave shape facing toward the projection lens when seen from above, and wherein an edge portion of the auxiliary reflector on a side of the reflector is curved in a convex shape when seen from above.

11. The vehicle headlamp according to claim 10, wherein the edge portion of the shade is formed in a concave shape facing an upward direction when seen from the front, and wherein the optical axis is rotated in a horizontal direction by a swivel mechanism.

12. The vehicle headlamp according to claim 11, wherein the swivel mechanism includes an actuator that is driven in accordance with a steering operation of the vehicle.

13. The vehicle headlamp according to claim 9, wherein the edge portion of the shade is formed in a concave shape facing an upward direction when seen from the front, and wherein the optical axis is rotated in a horizontal direction by means of a swivel mechanism.

14. The vehicle headlamp according to claim 9, wherein the shade comprises a front surface facing the projection lens, wherein the front surface of the shade is curved, wherein a width of the front surface is gradually increased toward the front direction, and wherein the shade supports the projection lens.

15. The vehicle headlamp according to claim 9, wherein the shade and the auxiliary reflector are separate components.

* * * * *